US011439892B2

(12) United States Patent
Yoshida

(10) Patent No.: US 11,439,892 B2
(45) Date of Patent: Sep. 13, 2022

(54) GAME PROGRESS INFORMATION GENERATION SYSTEM, AND COMPUTER PROGRAM AND CONTROL METHOD THEREFOR

(71) Applicant: KONAMI DIGITAL ENTERTAINMENT CO., LTD., Tokyo (JP)

(72) Inventor: Takahiro Yoshida, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 1 day.

(21) Appl. No.: 16/999,574

(22) Filed: Aug. 21, 2020

(65) Prior Publication Data

US 2020/0376364 A1 Dec. 3, 2020

Related U.S. Application Data

(63) Continuation of application No. PCT/JP2019/009038, filed on Mar. 7, 2019.

(30) Foreign Application Priority Data

Mar. 15, 2018 (JP) .............................. JP2018-048010

(51) Int. Cl.
*A63F 13/86* (2014.01)
*A63F 1/06* (2006.01)

(52) U.S. Cl.
CPC ................ *A63F 1/06* (2013.01); *A63F 13/86* (2014.09); *A63F 2300/577* (2013.01)

(58) Field of Classification Search
CPC ........ A63F 13/45; A63F 13/86; A63F 13/213; A63F 13/424; A63F 2003/00662
See application file for complete search history.

(56) References Cited

U.S. PATENT DOCUMENTS

2002/0123376 A1* 9/2002 Walker ................ G07F 17/3244
463/11
2009/0197676 A1* 8/2009 Baerlocher ......... G07F 17/3211
463/30

(Continued)

FOREIGN PATENT DOCUMENTS

JP 2002-239207 A 8/2002
JP 2003-103045 A 4/2003

(Continued)

OTHER PUBLICATIONS

International Search Report dated Apr. 9, 2019 from the International Searching Authority in International Application No. PCT/JP2019/009038.

(Continued)

*Primary Examiner* — James S. McClellan
(74) *Attorney, Agent, or Firm* — Sughrue Mion, PLLC

(57) ABSTRACT

A game progress information generation system for a game, in which players compete against each other while respectively arranging physical game media in a field, configured to generate progress information for specifying progress status of the game, and comprising: a medium information acquiring device acquiring medium information required for identification of the arranged game medium; a medium identification device identifying the arranged game medium based on the acquired medium information; an action information acquiring device acquiring action information required for identification of action of the player; an action identification device identifying the action of the player based on the acquired action information; and a progress information generation device repeatedly determining the progress status of the game while referring to an identification result of each of the medium identification device and (Continued)

the action identification device, and generating the progress information based on a determination result to be obtained.

10 Claims, 8 Drawing Sheets

(56) References Cited

U.S. PATENT DOCUMENTS

| | | | | |
|---|---|---|---|---|
| 2009/0291762 A1* | 11/2009 | Walker | ............... | G07F 17/3241 |
| | | | | 463/42 |
| 2012/0315970 A1* | 12/2012 | Stjarnlov | ............ | G07F 17/3262 |
| | | | | 463/13 |
| 2016/0328604 A1* | 11/2016 | Bulzacki | .............. | G06Q 10/063 |

FOREIGN PATENT DOCUMENTS

| | | |
|---|---|---|
| JP | 2015-092205 A | 5/2015 |
| JP | 2017-188833 A | 10/2017 |
| JP | 2017-189446 A | 10/2017 |
| KR | 10-2014-0072952 A | 6/2014 |

OTHER PUBLICATIONS

Written Opinon dated Apr. 9, 2019 from the International Bureau in International Application No. PCT/JP2019/009038.
Communication dated Sep. 26, 2018 from the Japanese Patent Office in Application No. 2018-048010.
Notice of Preliminary Rejection dated Mar. 30, 2022 from the Korean Intellectual Property Office in KR Application No. 10-2020-7024135.

* cited by examiner

GAME PROGRESS INFORMATION GENERATION SYSTEM, AND COMPUTER PROGRAM AND CONTROL METHOD THEREFOR

BACKGROUND OF THE INVENTION

Field of the Invention

The present invention relates to a system and the like for generating progress information that specifies a progress status of the game.

Description of the Related Art

A system for shooting (or recording) a playing status of a game, and adding an effect to the obtained moving image (video) to provide a user with viewing it has been proposed (see, for example, Patent Literature 1). There is a known system in which a game medium used in a game, that uses physical game media, for example, a board game such as chess or shogi, or a card game that uses playing cards, trading cards or the like, is identified on the basis of a bar code provided on the game medium, information recorded on an IC chip disposed on the game medium, or information obtained through image recognition, and an image corresponding to the identification result is added to the playing image of the game to provide a user with viewing it (see, for example, Patent Literature 2).

CITATION LIST

Patent Literature

Patent Literature 1: JP2017-188833 A
Patent Literature 2: JP2003-103045A

SUMMARY OF THE INVENTION

By the above-described conventional technologies, the position and type of the game medium is identified on the basis of the image or the information included to the game medium, and determine the progress status of the game from the identification results. For certain games, however, it may not be possible or difficult to accurately grasp the progress status of the game only by the identification information of the game medium such as the position and type of the game medium. For example, in a game such as a card game, a board game or the like in which players compete with each other using game media such as physical cards, the game may proceed with not only an operation of arranging the game medium in a game filed but also physical movements such as a gesture of the player, or with utterance (voices, speech). In this type of game, it may be impossible or difficult to determine what status the game is in if the information of the position and type of the game medium is only available.

Accordingly, an object of the present invention is to provide a game progress information generating system or the like, which can generate progress information for specifying the progress status of the game more accurately than conventional technologies.

A game progress information generation system according to one aspect of the present invention is a game progress information generation system for a game in which a plurality of players compete against each other while respectively arranging a plurality of physical game media in a predetermined field, and the game proceeds while an operation, of each player, of arranging the game medium in the field and an action of each player different from the operation are utilized as behavior of each player, configured to generate progress information for specifying progress status of the game; and comprising: a medium information acquiring device acquiring medium information required for identification of the game medium arranged in the field; a medium identification device identifying the game medium arranged in the field based on the medium information acquired by the medium information acquiring device; an action information acquiring device acquiring action information required for identification of the action of the player; an action identification device identifying the action of the player based on the action information acquired by the action information acquiring device; and a progress information generation device repeatedly determining the progress status of the game while referring to an identification result of each of the medium identification device and the action identification device, and generating the progress information based on a determination result to be obtained.

A non-transitory computer readable recording medium according to another aspect of the present invention has a computer program for a game progress information generation system for a game in which a plurality of players compete against each other while respectively arranging a plurality of physical game media in a predetermined field, and the game proceeds while an operation, of each player, of arranging the game medium in the field and an action of each player different from the operation are utilized as behavior of each player, the game progress information generation system configured to generate progress information for specifying progress status of the game, and comprising a medium information acquiring device acquiring medium information required for identification of the game medium arranged in the field, and an action information acquiring device acquiring action information required for identification of the action of the player, and the computer program configured to cause a computer included in the game progress information generation system to function as: a medium identification device identifying the game medium arranged in the field based on the medium information acquired by the medium information acquiring device; an action identification device identifying the action of the player based on the action information acquired by the action information acquiring device; and a progress information generation device repeatedly determining the progress status of the game while referring to an identification result of each of the medium identification device and the action identification device, and generating the progress information based on a determination result to be obtained.

A control method according to still another aspect of the present invention is a control method for a game progress information generation system for a game in which a plurality of players compete against each other while respectively arranging a plurality of physical game media in a predetermined field, and the game proceeds while an operation, of each player, of arranging the game medium in the field and an action of each player different from the operation are utilized as behavior of each player, the game progress information generation system configured to generate progress information for specifying progress status of the game, and the control method comprising: acquiring medium information required for identification of the game medium arranged in the field; identifying the game medium arranged in the field based on the acquired medium information; acquiring action information required for identification of the action of the player; identifying the action of the player based on the acquired action information; and repeatedly determining the progress status of the game while referring to an identification result based on the medium information and an identification result based on the action information, and generating the progress information based on a determination result to be obtained.

DESCRIPTION OF THE EMBODIMENTS

Figure 1:
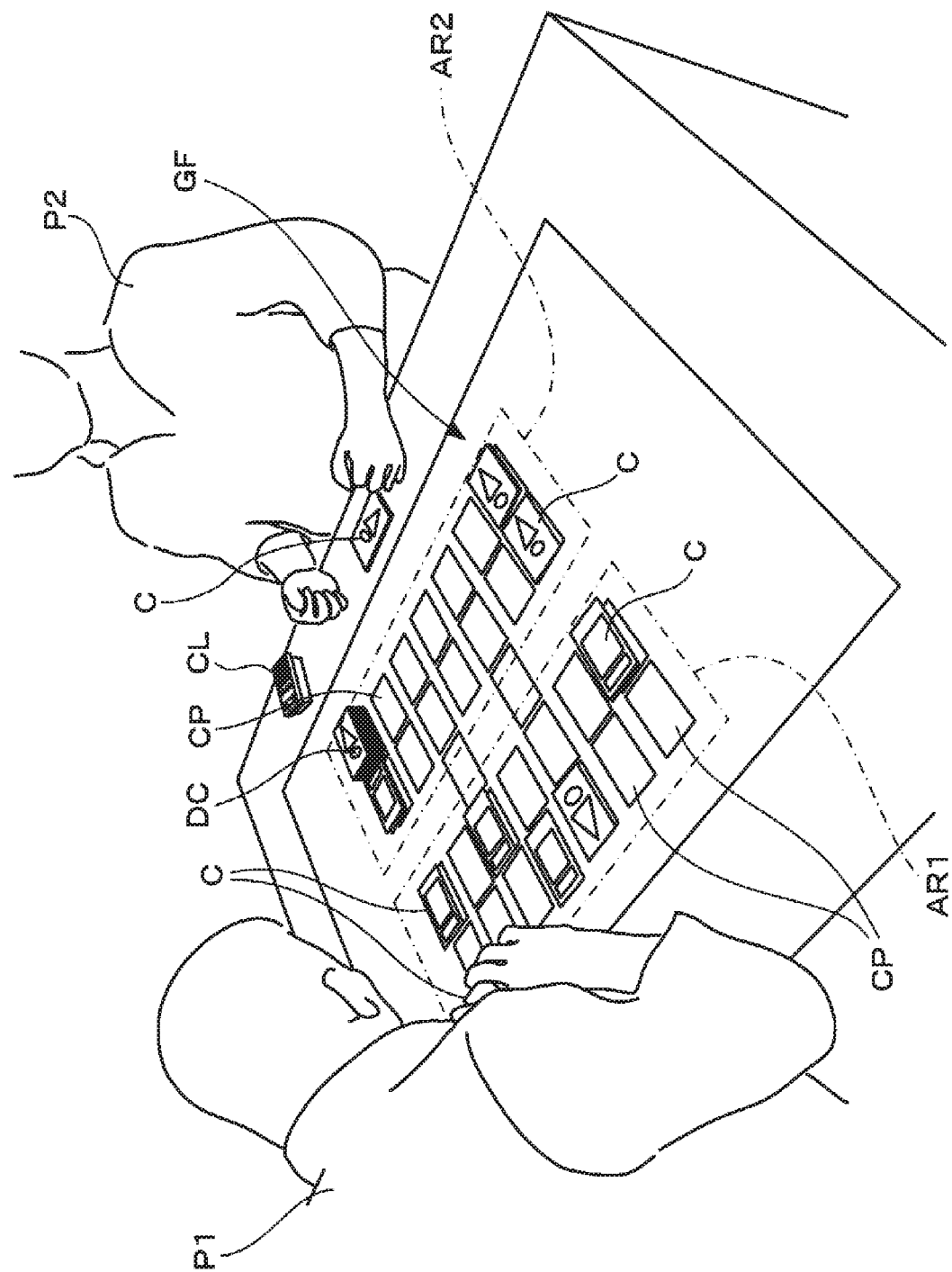
FIG. 1 shows an example of a situation in which a game to which a game progress information generating system according to one embodiment of the present invention is applied is played.

A game progress information generation system (hereinafter, sometimes abbreviated as an information generating system) according to one embodiment of the present invention will now be described with reference to the drawings. Incidentally, in each of the drawings, when a plurality of elements, which are similar to each other, are depicted, a reference numeral may be assigned to one or some of such elements, as representatives of all the elements, in order to avoid the complication of the illustration. In the following description, the teens such as "first" and "second" may be used to distinguish elements from each other, but such terms are used for convenience of explanation and have no precedence or other significance.

Referring firstly to FIG. 1, a game will be described as an example to which the information generating system of this embodiment is applied. The game shown in FIG. 1 is configured as a kind of card competition game in which two players P1 and P2 compete against each other using cards C as an example of physical game media. As is well known, in the card competition game, there are a plurality of types of cards C having different applications, roles, effects, and the like in the game. A wide variety of cards are used, for example, cards used to attack opponent's cards, cards used to enhance or weaken the effects of attacks, and cards used to call special characters (sometimes the special characters are referred to as monsters, etc.) to produce specific or unique effects. The cards C are often appropriately included into a deck DC, which means a bundle of cards C, for use in a game. However, details of the type of the cards C may be appropriately decided according to the contents of the game, and therefore the details of the type of the cards C and the like will not be described in the following description. On the front side (face) of each of the cards C, an image representing a character such as a monster to be symbolized by the card C, an image symbolizing the effect of the card C, a name of the character or the effect of the card C, letters (texts) which indicate attributes, symbols, patterns, etc., are illustrated as appearance elements characterizing the appearance of the card C. On the other hand, the back side of the card C is given a common appearance for all the cards C in order to make it impossible to distinguish the cards C from each other when the cards C are turned over (when the cards are placed their faces down). In FIG. 1, illustration of the details of the individual cards C is omitted, and each of the cards C is visually distinguished depending on whether the front side (face) of the card C in question is up or down.

The game proceeds by utilizing a game field GF as an example of a field where the players P1 and P2 should place (or arrange) the cards C. A plurality of card placing spots CP are defined in the game field GF. Each card placing spot CP has generally the same shape and size as a single card C. The card placing spots CP are provided separately in a first area AR1 and a second area AR2 except for two card placing spots CP arranged at the center in the direction in which the players P1 and P2 face each other. The card placing spots CP in the first area AR1 are used by the player P1, and the card placing spots CP in the second area AR2 are used by the other player P2. Basically, one of the players P1 and P2 uses one of the two center card placing spots CP, and the other of the players P1 and P2 uses the other of the two center card placing spots CP. The card placing spots CP in each of the areas AR1 and AR2 are further divided into a plurality of zones (not shown) depending on applications, roles and the like of the card placing spots in the game. For example, the card placing spots CP on the near-to-the-player side of the right end when viewed from each player P1, P2 is set as a zone in which a plurality of cards C constituting the deck DC are superimposed with the card faces down, and the card placing spots CP on the far-from-the-player side of the right end is set as a zone in which the cards C that have been used in the game or become unusable due to an attack from the other player are superimposed with the card faces up. The number of the card placing spots CP and the classification of the zones may be appropriately decided according to the rules of the game or the like, and a detailed description thereof will be omitted.

Each of the players P1 and P2 prepares the deck DC, which will be used in the game, from a large number of cards owned by the player concerned, and the game proceeds as each player arranges (places) the cards C included in the deck DC in the card placing spots CP appropriately. In the game, a player's movement different from the operation of arranging the cards C in the game field GF is also performed, e.g., the players P1 and P2 hold some of the cards C as hands or place the cards C at an appropriate position outside the game field OF. For example, FIG. 1 shows a situation in which the player P1 holds some of the cards C as the hands, and the player P2 turns the hands over (card faces down) and places the hands in front of the player P2. Further, in the game, an external device such as a calculator CL for calculating a numerical value that affects the progress of the game, such as the effect of the attack or a score, is sometimes used. It should be noted that the operation of arranging the cards C is a concept that is not limited to the operation of placing the cards C, which are picked up from the cards C in the player's hands or the deck DC, in the game field OF, but also includes an operation of changing the position(s) of the card(s) C already placed in the game field GF or an operation of changing the direction(s) of the card(s). That is, various operations that change the arrangement of the cards C in the game field GF may be included in the concept of the operation of placing the cards C.

Figure 2:
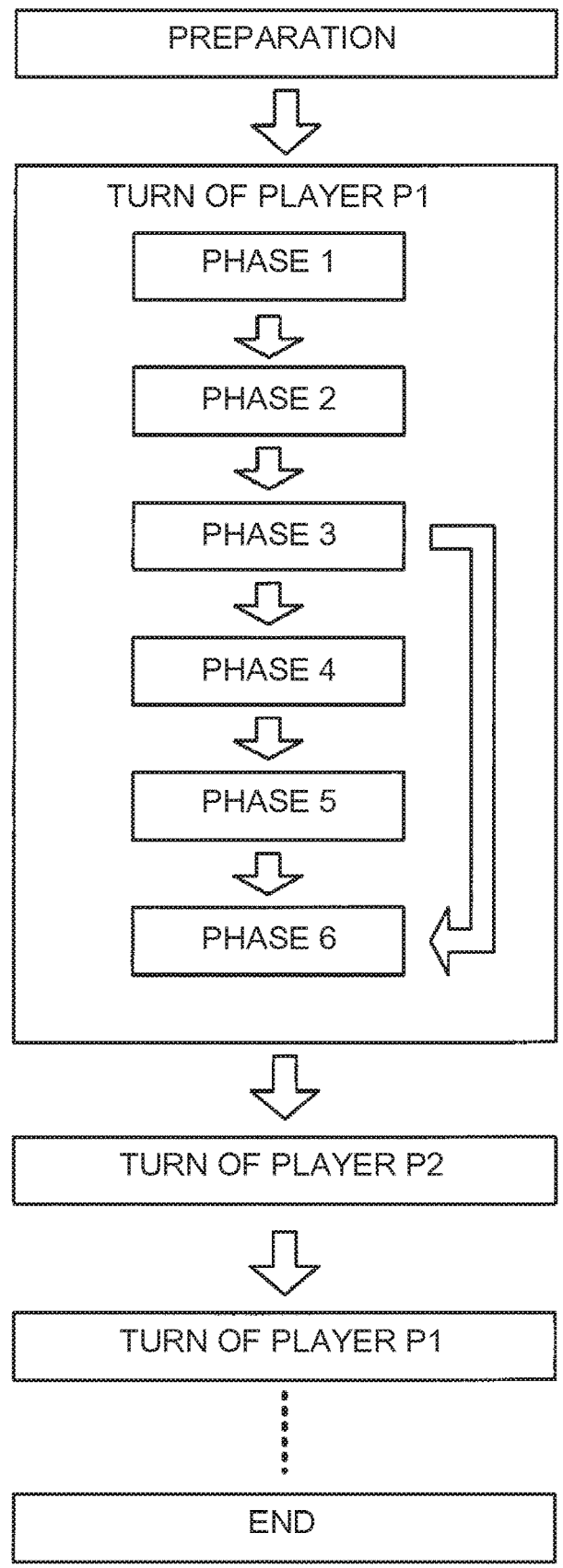
FIG. 2 is a diagram illustrating an example of the progress procedure of the game shown in FIG. 1.

FIG. 2 shows an example of the progress in the game. The game shown by FIG. 1 proceeds in a so-called turn system in which the operation of turn is alternately repeated between the players P1 and P2. First, as a preparation of the game, for example, an operation is performed in which the deck DC of each of the players P1 and P2 is shuffled and placed in the card placing spot CP on the near-to-the-player side of the right end, and a predetermined number of cards C are picked up from the deck DC of the player P1, P2 to hold the cards as the hands. When the preparation is completed, the game starts from the turn of the player who attacks first (for example, the player P1 attacks first). One turn is divided into a plurality of phases. A plurality of phases is a concept for classifying the procedure to be done in a single turn into a plurality of stages according to the content and nature of the procedure. In the example of FIG. 2, one turn is divided into six stages, i.e., from a phase 1 to a phase 6, but this is just an example.

In each phase, the player P1 (or P2) who is given the turn may select an appropriate behavior within a range determined for the phase concerned. An example is as follows. In the phase 1, a card C is picked up from the deck DC, and in the phase 2, the effect of the card C, which is designated as the effect for that an effect processing is to be performed in the phase 2, can be activated. In the phase 3, while using the cards C as appropriate, various behaviors such as calling (summoning) a virtual character such as a monster to be used in a battle, setting a card C having a specific effect such as magic or trap, or activating the effect of the card C are allowed. In the phase 4, fighting (battle) using the cards C is performed. For example, fighting is performed by selecting a card C used by the player P1 (or P2) of its own turn for the attack and another card C as the attack target of the other player P2 (or P1). Instead of or in addition to the card C, the opponent player itself may be the attack target. The outcome of the fighting depends on the parameters such as the attribute and strength of the card C in use. In the phase 5, the same behaviors as in the phase 3 are allowed. In the phase 6, the end of the turn is declared. It should be noted that the battle of the phase 4 can be avoided by the selection made by the player P1 (or P2) to which the turn is given. In that case, the phases 4 and 5 are skipped.

When one turn is finished, the turn shifts to the other player P2 (or P1). The game ends as the turns are alternately repeated and the predetermined ending condition is satisfied. The ending condition is satisfied, for example, when the value of a parameter such as the life set for the player P1, P2 decreases to a predetermined value (e.g., 0) by the battle.

In the above-described game, the end of one phase may be indicated explicitly by operation of the card C, or may be indicated by an action different from the card operation of the player P1, P2, for example, a gesture or other physical movement, or utterance of the player P1, P2. For example, a rule may be set for the player to utter a predetermined statement at the end of a phase, and the phase may be switched by the utterance. Alternatively, even if there is no such utterance, the phase may be switched by an oral agreement between the players P1 and P2, gestures of the players P1 and P2, or other movements of the player P1 and/or the player P2. In the example of FIG. 2, if the fighting of the phase 4 is avoided and the phases 4 and 5 are skipped, the intention to avoid the fight may be indicated by the utterance of the player P1 (or P2), or by the physical movement of the player P1 (or P2). The end of the turn in the phase 6 may also be agreed upon by the physical movements of the players P1 and P2 without explicit utterances. In such a case where the phase is switched based on an action such as a physical movement or utterance of the players P1 and P2, it may be impossible or difficult to identify the change of the phase and thus the end of the turn only by identifying the cards C in the game field GF.

Moreover, not only the switching of the phase but also the action different from the operation of the card C in the game field GF even within one phase may affect the progress of the game. For example, when the fighting of the phase 4 is selected, the players P1 and P2 may designate the card C (or the player itself) to be attacked by fingers or other body movements, or may verbally designate the card C (or the player itself) to be attacked. If the effect of the card C is set such that a desired card C is excluded from the hands as a card C that cannot be used in the game, the player may designate the card C to be excluded by a gesture or may verbally designate the card C to be excluded. Although such an action is also the behavior required to identify the progress status of the game, it is impossible or difficult to detect the action simply by identifying the cards C in the game field GF.

In view of the above-described problems, the information generation system of this embodiment determines the progress status of the game by identifying utterance or physical movements that are different from the operation of the card C by the players P1 and P2 (hereinafter, sometimes represented by the reference symbol PL) in addition to the identification of the card C in the game field. GF. Hereinafter, an example of the information generation system will be described with reference to FIG. 3 to FIG. 7. As is apparent from the foregoing description, it should be noted that the game to which the information generation system is applied is a game in which a plurality of players PL compete against each other while arranging the cards C in the game field GF, and the game proceed while an operation of each player PL to arrange the cards C in the game field GF and an action of each player PL different from the each player's operation are utilized as behaviors of each player P1 in the game. The behavior of the player PL influences the progress of the game, and includes an operation of arranging the card(s) C in the game field GF, and an action different from the card arranging operation. The action includes physical movements such as player PL gestures, or utterances. In other words, in this specification, the term "behavior" in the game is a term that represents a concept including an operation of arranging a game medium and an action different from the game medium arranging operation, and the term "action" is a term that represents a concept including "movements" and "utterances" of a player.

Figure 3:
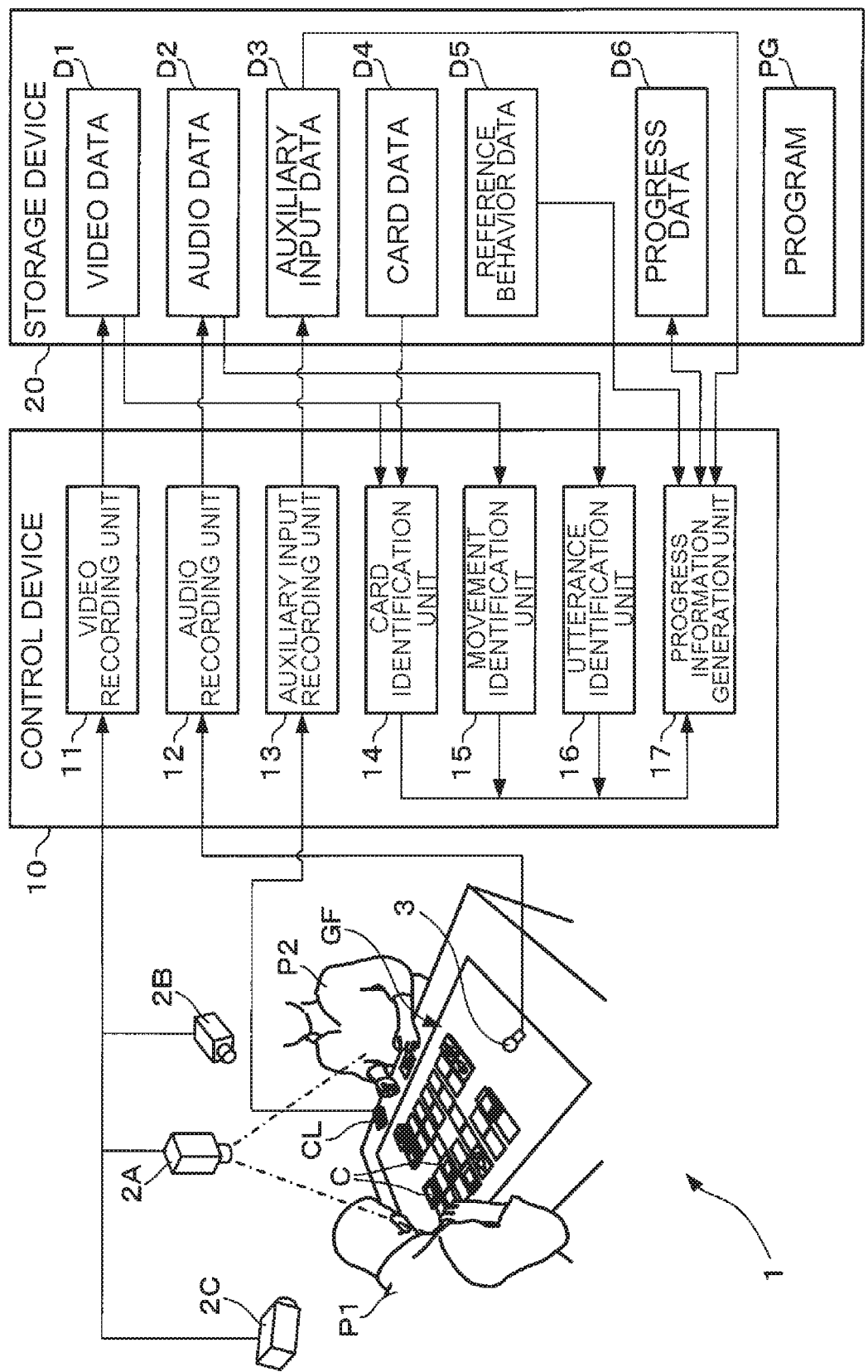
FIG. 3 shows an example of an overall configuration of a game progress information generation system according to one embodiment.

FIG. 3 shows an example of the configuration of the information generation system. The information generation system 1 includes afield camera 2A, player cameras 2B and 2C, and a microphone 3. The field camera 2A is an example of a medium image acquiring device for acquiring, as an example of medium information, information of an image of the game field GF in which the cards C are arranged, or an example of the medium information acquiring device. The player cameras 2B and 2C is an example of a movement acquiring device or a player image acquiring device for acquiring information of an image captured to contain the player PL at least in such a manner as to shoot the movement of the player PL, as an example of information corresponding to the movement of the player PL. The microphone 3 is an example of a sound acquiring device for converting sounds (voices) uttered respectively by the players P1 and P2 into electronic sound signals, and outputting the obtained sound signals as an example of information corresponding to the sounds of the player PL. The player cameras 2B and 2C and the microphone 3 correspond to an example of an action information acquiring device. Each of the field camera 2A, the player camera 2B and the player camera 2C converts an optical image into an electronic image signal by an individual image pickup device and outputs the electronic image signal. The field camera 2A may be disposed such that at least a portion of the players P1 and P2 is included in the field of view of the field camera. Thereby the field camera 2A functions as at least a part of the movement acquiring device and the player image acquiring device. Alternatively, if the field camera 2A sufficiently captures not only the game field GF but also a necessary area of the players PL, the player cameras 2B and 2C may be omitted, and the field camera 2A may also be used as an example of the medium image acquiring device and the movement acquiring device. In the following description, when there is no particular need to distinguish the cameras 2A-2C from each other, the cameras 2A-2C may be collectively referred to as the camera 2. In the information generation system 1, the calculator CL is also utilized as an example of an auxiliary device to which information related to the progress of the game is introduced.

The information generation system 1 further includes a control device 10 and a storage device 20. The control device 10 is configured as an example of a computer including a CPU and peripheral units such as an internal memory necessary for the functioning of the CPU. The camera 2A-2C, the microphone 3, the calculator CL and the storage device 20 are connected to the control device 10. Input device and/or output device, such as a keyboard, a pointing device, a monitor and a speaker, may also be connected to the control device 10 as appropriate, but illustrations of such devices are omitted. The storage device 20 is a storage device using a non-volatile storage medium such as a magnetic disk and a flash memory, and functions as an external storage device to the CPU of the control device 10. A predetermined computer program PG is recorded in the storage device 20. The control device 10 has a video recording unit 11, an audio recording unit (voice recording unit) 12, an auxiliary input recording unit 13, a card identification unit 14, a movement identification unit 15, an utterance (or speech) identification unit 16, and a progress information generation unit 17 as logical devices realized by a combination of hardware resources of the control device 10 and a computer program PG as an example of software resources.

The video recording unit 11 records the image signals output from each of the cameras 2A-2C as video data D1 in the storage device 20 at appropriate timing. The audio recording unit 12 records the audio signals output from the microphone 3 as audio data (voice data) D2 in the storage device 20 at appropriate timing. The auxiliary input recording unit 13 acquires input information from the calculator CL, and records the obtained information in the storage device 20 as auxiliary input data D3 at appropriate timing. The data D1-D3 are suitably used for identification by the card identification unit 14 or other units, or for processing or other purposes in the progress information generation unit 17. It should be noted that the recording units 11 to 13 may add or process particular information in a manner that suits the processing of the identification units 14 to 16 or the like and record the resulting information in the storage device 20. For example, the time at which information such as an image or sound is acquired may be added to the data D1 to D3 and the data are recorded.

The card identification unit 14 analyzes the information of the image of the game field GF recorded in the video data D1, i.e., the information of the image captured by the field camera 2A, as an example of the medium information, and compares the analysis result with the card data D4 recorded in the storage device 20 to identify the card C. The card identification unit 14 also identifies the position of the card C in the game field GF and outputs information indicating the type and position of the card C. In other words, the card identification unit 14 identifies what type of card C is placed at which position in the game field GF. The identification of the card C is thus a concept including not only the identification of the type of the card C but also the identification of the position.

Figure 4:
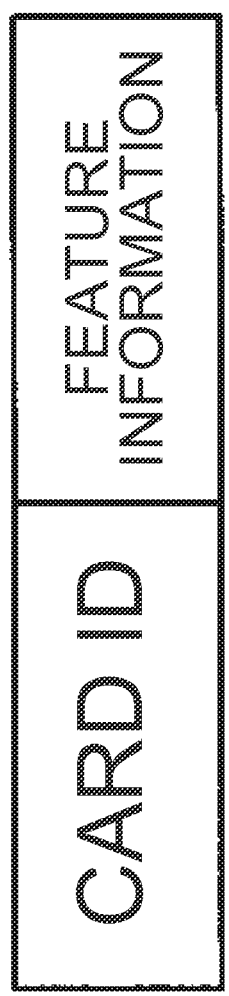
FIG. 4 is a diagram showing an example of a record recorded in a card data of FIG. 3.

As an example, as shown in FIG. 4, the card data D4 stores a record in which a card ID of the card C is recorded in association with feature information. The card ID is an example of the media identification information uniquely set for each type of the card C. The feature information is information describing the appearance features on the front side (face) of the card C. The appearance elements on the front sides of the cards C are different from each other depending on the respective types of the cards C as described above. Accordingly, it is possible to specify the type of the card C in question on the basis of the image of the card C, and the feature information is generated in advance as information describing the features of the appearance element. If the card C is extracted from the image captured by the camera 2A and analyzed so that the extracted image of the card C can be compared with the feature information, the card ID corresponding to the type of the card C can be identified from the image of the card C. The specific contents of the card C, such as the name of the character or the like, attributes, strength, and effect, are previously recorded in the data (not shown) in association with the card ID. Therefore, if the card ID is determined, the specific contents of the card C can be determined using the card ID as a clue. It should be noted that such information may be added to the card data D4.

Referring back to FIG. 3, the movement identification unit 15 analyzes the information of the image of each of the player cameras 2B and 2C recorded in the video data D1 as an example of the action information, and identifies the movement of each player PL based on the analysis result. It should be noted that the images of field camera 2A may also be utilized to identify player's movements. Identification of the player's movement is, for example, to identify what motion the hand(s), finger(s), or head of the player PL has performed. For example, when a player points to a particular position of the game field GF, the motion of the player is identified along with the pointing position or direction. Various techniques used for motion identification based on image analysis may be utilized for the identification of the player's movement. The specific degree of identifying the movement of the player PL may be appropriately selected depending on the degree necessary to specify the progress status of the game. The utterance identification unit 16 analyzes the information of the voice of the player PL recorded in the audio data D2 as an example of the action information, and identifies the utterance of each player PL based on the analysis result. In other words, the utterance identification unit 16 identifies what kind of sentences and/or words were uttered by each player PL during the play of the game. Various techniques used for conversations identification or the like based on speech analysis may also be utilized for identification of utterances.

The progress information generation unit 17 specifies the progress status of the game by appropriately selecting and referring to the identification results of the card identification unit 14, the movement identification unit 15, and the utterance identification unit 16 and the reference behavior data D5 recorded in the storage device 20, and records the progress information corresponding to the identified result in the storage device 20 as the progress data D6. The information itself already recorded in the progress data D6 may be referred to for specifying the progress status in the progress information generation unit 17. The reference behavior data D5 is a data prepared by recording a predetermined behavior (reference behavior) that becomes a key to identify the progress status of the game. The reference behavior is set as the behavior that should occur when the game is in a particular situation. For example, behaviors that occur whenever the game is in a particular situation, or behaviors that are likely to occur when the game is in a particular situation are selected as the reference behaviors. The behavior here includes the player's operation of the card C, player's movements other than the player's operation of the card, or player's utterances.

For example, if a player's movement picking up a card C from the deck DC is allowed only in a particular phase, the player's movement picking up a card C may be set as one of the reference behaviors that should occur in the phase. When it is a common practice to designate the card. C (or the opponent player PL) to be attacked in the battle by the finger motion pointing the player PL or the card C, such player's movement may be set as one of the reference behaviors that should occur in the situation where the attack target is designated. If words such as "I enter a XX phase" is commonly uttered when moving to a next phase, such words may be set as one of the reference behaviors that should occur in the situation where the phase change takes place. If words such as "I activate the effect of YY" to activate the effect of the specific card C" is frequently uttered, such words may be set as one of the reference behaviors that should occur in the situation that activates the effect of the card C. The reference behaviors are not limited to the above-described examples, and the reference behaviors may include a behavior set in association with the operation of the auxiliary device. For example, if the calculator CL is used in calculating the effect of the battle, the input operation to the calculator CL can be set as one of the reference behaviors that should occur when the battle is performed. The reference behaviors can be appropriately selected by deriving behaviors that are likely to take place in specific situations with reference to a number of competition examples that are actually taking place. What kind of behaviors should be selected as the standard behavior may be appropriately determined according to the content of the game.

The progress information generation unit 17 can determine that the reference behavior should occur in the game if the reference behavior data D5 includes reference behaviors that match or are similar to the behaviors identified by the card identification unit 14, the movement identification unit 15, and the utterance identification unit 16, respectively. The reference behavior recorded in the reference behavior data D5 may be set in association with any one of the following behaviors of the player PL, i.e., any one of the player's operation of the card, the player's movement and the player's utterance, or may be set by a combination of such behaviors. For example, if under certain circumstances a characteristic combination of the operation of card C and utterance occurs, the reference behavior in the situation may be defined by the combination of the operation and the utterance. Therefore, when the respective identification results of the card identification unit 14, the movement identification unit 15, and the utterance identification unit 16 are compared with the reference behavior data D5, the identification results of the identification units 14 to 16 may be referred to alone or in combination as appropriate. In addition, a reference behavior may be set in combination with a unique input operation for the auxiliary device. In that case, the progress information generation unit 17 may also appropriately refer to the auxiliary input data D3 to specify the progress status of the game.

Figure 5:
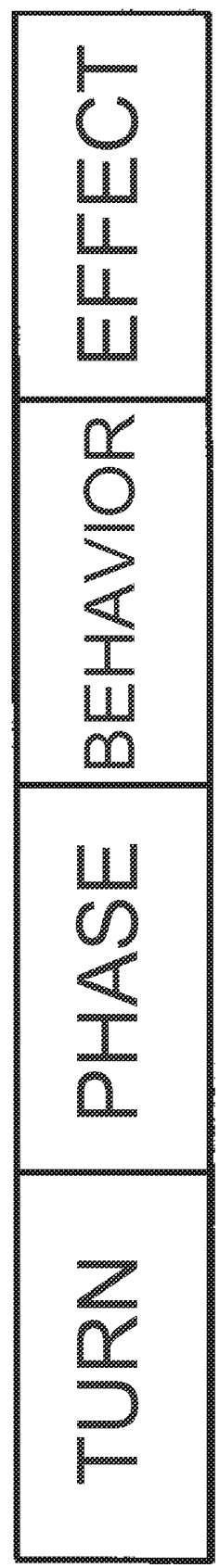
FIG. 5 is a diagram showing an example of a record recorded in a progress data of FIG. 3.

The progress information generated by the progress information generation unit 17 can be appropriately determined according to the type, contents and the like of information required to identify the progress status of the game. FIG. 5 shows an example of a progress record, which will be recorded as progress information in the progress data D6. In the example of FIG. 5, a progress record is configured to include turn information, phase information, behavior information, and effect information. The turn information is information indicating whether the turn in question is the turn of the player P1 or P2, and the phase information is information indicating which phase within one turn is the phase in question. The behavior information is information describing, in a predetermined range, the behavior identified based on the identification results of the identification units 14-16. The effect information is information describing what effect is produced in the game by the behavior recorded in the same record. The effect information will be described later. By combining the above-mentioned information and recording it in the progress record, the status at a specific time point of the game is recorded in the progress data DC. For example, the following information is recorded in the progress data D6, i.e., in the phase 4 where the player who attacks first has the turn, a card XX of a player who attacks second is attacked by a card YY, thereby causing the effect of . . . .

The progress information generation unit 17 repeatedly generates the progress record illustrated in FIG. 5, and then records the progress record in the progress data D6. Thus, the progress data D6 is a set of progress records. The range of behaviors recorded on one progress record may be determined as appropriate. It is not necessarily required to record all of the behaviors identified within one phase in the same record. Behaviors taken within one phase may be recorded separately into a plurality of progress records.

Referring back to FIG. 3, the progress information generation unit 17 not only determines the progress status of the game itself, for example, the turn, the phase and the behavior, but also estimates the effect, which is an influence occurring in the progress of the game based on the determination result. That is, the progress information generation unit 17 estimates the effect that should be caused by the behavior of the player PL based on the information of the progress status of the game, such as the information of the turn, the phase, and the behavior of the player PL, which is specified by referring to the identification results of the identification units 14-16 as well as the input information to the auxiliary device such as the calculator CL as necessary. The input information can be determined from the auxiliary input data D3. For example, the progress information generation unit 17 calculates what effect occurs by the change in the type or position of the card C in the game field GF or by the movement or utterance of the player PL. In the calculation, the specific contents of the card C, for example, the effect of the card C and other information, are appropriately referenced while using the card ID as a key. When such information is recorded in the card data. D4, the progress information generation unit 17 may use the card data D4 for the estimation of the effect. The estimation result is added to the progress record, for example, as illustrated in FIG. 5. The addition of the effect information can increase the value of the progress data. D6.

Figure 6:
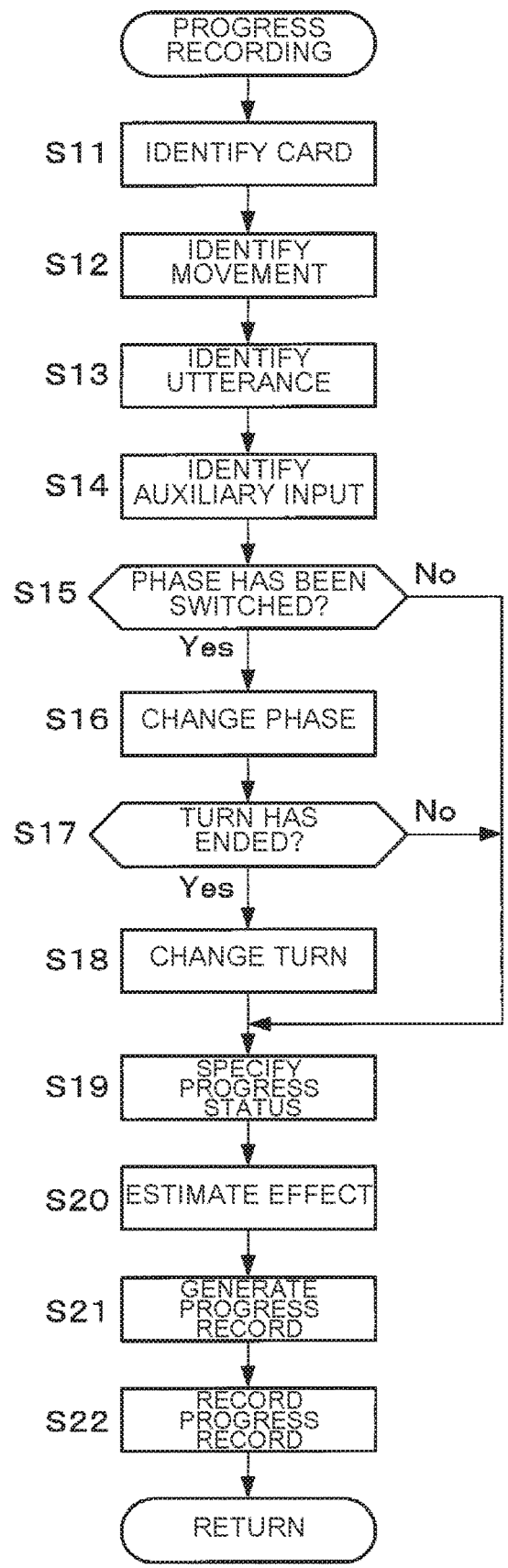
FIG. 6 is a flowchart illustrating an example of a procedure of a game progress recording process performed by a control device shown in FIG. 3.
Figure 7:
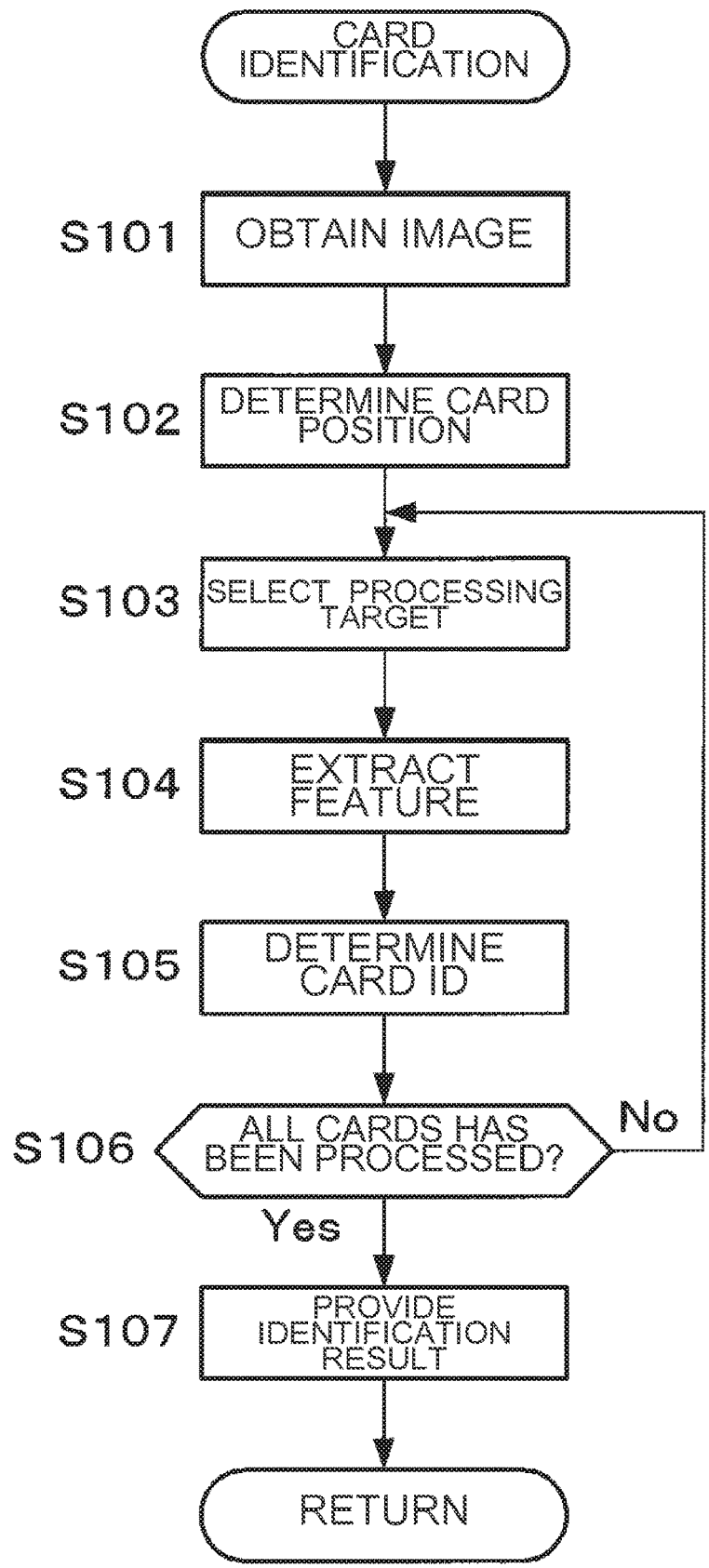
FIG. 7 is a flowchart illustrating an example of a card identification process executed as a subroutine process in FIG. 6.

Referring now to FIG. 6 and FIG. 7, an example of processing executed by the control device 10 of the information generation system 1 to generate a progress record of the game and record the progress record in the progress data 136 will be described, FIG. 6 shows an example of the procedure of the progress recording process executed by the control device 10. The processing of FIG. 6 may be performed repeatedly at appropriate cycles while the game is being played. In conjunction with the processing of FIG. 6, the video recording unit 11, the audio recording unit 12, and the auxiliary input recording unit 13 record information corresponding to the output signals of the camera 2, the microphone 3, and the calculator CL in the data D1 to D3 at appropriate timing. As the progress recording process of FIG. 6 starts, the card identification unit 14 of the control device 10 analyzes the image recorded in the video data D1 to identify the position and type of the card C in the game field GF (Step S11), the movement identification unit 15 analyzes the image recorded in the video data D1 to identify the movement of the player PL (Step S12), and the utterance identification unit 16 identifies the utterance of the player PL based on the information of the voice recorded in the audio data. D2 (Step S13).

FIG. 7 shows an example of a procedure of a card identification process in which the card identification unit 14 executes as a subroutine process in Step S11 of FIG. 6 to identify the card C. In the card identification process of FIG. 7, the card identification unit 14 obtains the most recent image of the game field GF from the video data D1 (Step S101), and analyzes the obtained image to determine the position of the card C placed in the game field GF (Step S102). The objects (or targets) that undergo the determination process of Step S102 may only be those cards C which are placed with the card faces up, i.e., those cards C which are arranged such that the identification is possible based on the appearance element. Then, the card identification unit 14 selects one card C, as a processing target (card to be processed), from the cards C that have been determined in Step S102 (Step S103).

Subsequently, the card identification unit 14 extracts the feature information of the appearance of the card C to be processed (Step S104). Further, the card identification unit 14 extracts a record having the same feature information as the extracted feature information or the nearest feature information to the extracted feature information from the card data D4, and determines that the card ID of the record is the card ID of the card C (Step S105). Thereafter, the card identification unit 14 determines whether or not the process of determining the card ID for all the cards C determined in Step S102 has been completed (Step S106). If there is one or more unprocessed cards C, the card identification unit 14 returns to Step S103 and selects a processing target from the unprocessed cards C. If it is determined in Step S106 that all the cards C have been processed, the card identification unit 14 provides the position and the card ID of the determined card C to the progress information generation unit 17 as the identification result (Step S107), and thus the card identification process terminates at this point in time. Incidentally, as the processing of FIG. 7 is executed, it is possible to identify the arrangement of the cards C in the game field GF at a specific point in time in the game. Further, as the processing of FIG. 7 is repeated, it is possible to determine the change in the arrangement of the cards C in the game field GF, so that the operation of placing the card C is identified through the change in the arrangement.

Referring back to FIG. 6, the movement identification (Step S12) by the movement identification unit 15 is a process of identifying the movement of the player PL from the video data D1, describing the obtained player's movement in a predetermined data format, and providing it to the progress information generation unit 17. The utterance identification (Step S13) by the utterance identification unit 16 is a process of identifying the utterance content of the player PL from the audio data D2, describing the obtained utterance in a predetermined data format, and providing it to the progress information generation unit 17. The above-mentioned processes may employ commonly utilized techniques for identifying actions or conversations, and the details of the identification procedures are omitted in the description. It should be noted that Step S11 to Step S13 are not necessarily required to be sequentially processed, e.g., Step S11 to Step S13 may be processed in parallel.

Following the processing of Step S11 to Step S13, or in parallel with the processing of Step S11 to Step S13, the progress information generation unit 17 refers to the auxiliary input data D3 and identifies the input contents to the calculator CL (Step S14). This is a process to identify what kind of information was introduced to the calculator CL. If information of the calculator CL is not required, the processing of Step S14 may be omitted as appropriate. For example, if upon referring to the progress record already recorded in the progress data D6, it is found that the current phase is a phase in which no inputting by the calculator CL occurs, then it may be determined that the processing of Step S14 is skipped.

Next, the progress information generation unit 17 determines whether or not the phase has been switched based on the information obtained by the processing of Step S11 to Step S14 and the reference behavior data D5 (Step S15). This processing can be realized by determining whether or not a behavior that matches the reference behavior recorded in the reference behavior data D5 as a behavior that should occur at the time of switching of the phase is detected, or whether or not a behavior that is similar to the reference behavior within a predetermined allowable range as a behavior that should occur at the time of switching of the phase is detected, based on the information obtained in Step S11 to Step S14, If there is a phase switching, the progress information generation unit 17 changes the phase, which has been recognized until the current processing, to the next phase (Step S16). Thereafter, the progress information generation unit 17 determines whether or not the turn has ended based on the information obtained by the processing of Step S11 to Step S14 and the reference behavior data D5 (Step S17). This processing can also be realized by determining whether or not a behavior that matches the reference behavior recorded in the reference behavior data D5 as a behavior that should occur at the end of the turn is detected or whether or not a behavior that is similar to the reference behavior within a predetermined allowable range as a behavior that should occur at the end of the turn is detected, based on the information obtained in Step S11 to Step S14.

When it is determined in Step S17 that the turn has been completed, the progress information generation unit 17 changes the turn recognized so far (the currently recognized turn) to the next turn (Step S18), and then proceeds to the processing of Step S19. If a negative determination is made in Step S15, the progress information generation unit 17 skips the processing of Step S16 to Step S18 and proceeds to the processing of Step S19. When a negative determination is made in Step S17, the progress information generation unit 17 skips the processing of Step S18 and proceeds to the processing of Step S19.

In Step S19, the progress information generation unit 17 specifies the progress status of the game by referring to the information obtained in Step S11 to Step S14 and the turns and phases specified in the processes of Step S15 to Step S18 (Step S19). In short, the processing of Step S19 is processing to specify information to be recorded as turn information, phase information and behavior information in the progress record shown in FIG. 5. In the processing of Step S19, it is not always necessary to refer to all of the information obtained in Step S11 to Step S14. Depending on the turn and phase, the information to be referred to may be narrowed down. For example, when a behavior in a particular phase is in a state that can be determined only by the identification result made by one or two of the identification units 14 to 16, those identification results of the identification units 14 to 16 which need not be used for the identification are not required to be referred to. In other words, since the information to be referred to in order to specify the progress status of the game may change depending on which phase the game is in, the identification results of the identification units 14 to 16 may be appropriately selected and used in accordance with the phase. In addition, the behavior of the player PL may have different meanings according to the phase. In such a case, the progress status of the game is specified by appropriately referring to the identification results of the identification units 14 to 16, while taking into account the determination results of the phase and the turn. It should be noted that when it is necessary to grasp the history of the progress so far in order to specify the progress status, the information already recorded in the progress data D6 may be referred to as appropriate.

Upon having specified the progress status, the progress information generation unit 17 estimates, based on the information of the progress status specified in Step S19, the effect that should occur in the game, for example, the effect of attacking with the card C, or the effect that should occur in the game by activating the effect of the card C (Step S20). Next, the progress information generation unit 17 adds the estimation result of Step S20 to the progress status specified in Step S19 to generate a progress record (Step S21), and records the resulting progress record as a new record in the progress data D6 (Step S22), This completes the current progress recording process.

According to the above-described embodiment, the progress status of the game can be specified not only by referring to the identification result of the card C in the game field GF but also by referring to the identification result of the movement such as the gesture of the player PL or the identification result of the utterance of the player PL. Therefore, it is possible to generate the progress data. D6 that more accurately reflects the progress status of the game in comparison with the case where the progress status is specified depending on the identification result of the card C. The generated progress data D6 can be used, for example, to reproduce the progress status of the game. When the video data D1 or the audio data D2 is used for viewing and listening by a user via a network or the like, the progress data D6 can be added as information for explaining the progress status. An appropriate performance may be added to the video data D1 and the audio data. D2 based on the progress data DC. For example, when the attack is performed, when the effect of a predetermined level occurs, and/or when the winner and the loser are decided, processing such as adding a special performance to the video and/or audio may be made based on the progress data D6. An animation, a movie or the like for reproducing the progress status of the game may be generated based on the progress data D6. Alternatively, the progress data DC may be used to analyze the progress status of the game. It is also possible to analyze the progress data D6 of a large number of competitions to grasp the trend of the progress of the game. It is also possible to use the progress data DC to determine the situation of the game. For example, if the cards C included in the deck DC of each player PL are identified prior to the game play, the cards C still remaining in the deck DC or the cards C not yet placed in the game field GF can be determined as the unused cards C by appropriately referring to the progress data DC while the game is being played. Then, in consideration of the unused cards C and the progress status up to now identified from the progress data D6, it is possible to determine the superiority or inferiority in the battle between the players PL, that is, which player PL is dominant, while predicting the future behavior of each player PL, as an example of the situation in the game.

In the above-described embodiment, the card identification unit 14 of the control device 10 functions as an example of the medium identification device by executing the processing (including the processing in FIG. 7) of Step S11 of FIG. 6, the movement identification unit 15 and the utterance identification unit 16 function as an example of the action identification device by executing the processing in Step S12 and Step S13 of FIG. 6, the movement identification unit 15 functions as an example of the movement identification device by executing the processing in Step S12 of FIG. 6, and the utterance identification unit 16 functions as an example of the utterance identification device by executing the processing in Step S13 of FIG. 6. Further, the progress information generation unit 17 of the control device 10 functions as an example of the progress information generation device by executing the processing of Step S15 to Step S22 in FIG. 6.

Figure 8:
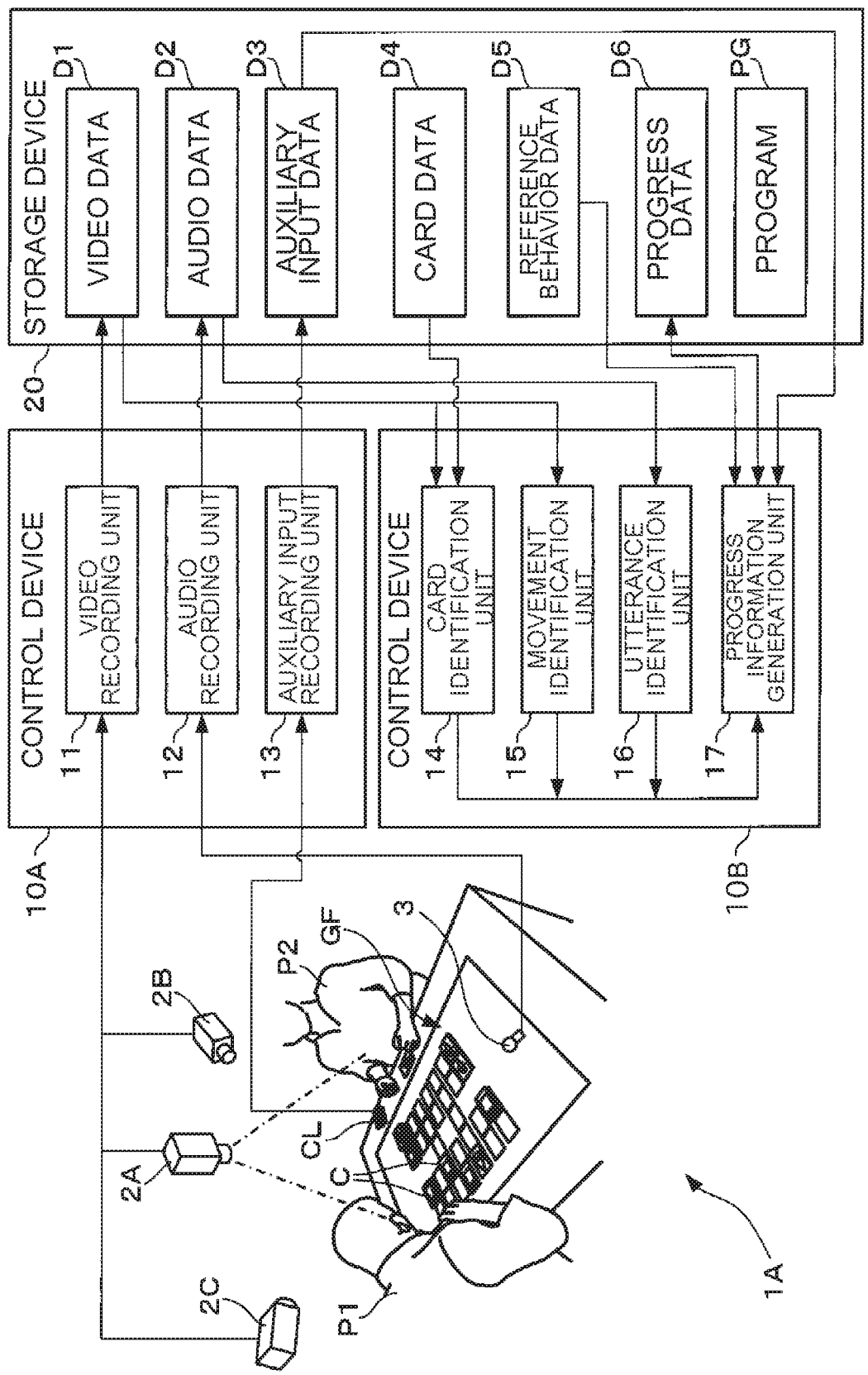
FIG. 8 shows a modification to the configuration shown in FIG. 3.

The present invention is not limited to each of the above-described embodiment(s) and may be implemented in those configurations which include various changes or modifications. For example, in the above-described embodiment(s), various processes are performed by the common control device 10, but as in the information generation system 1A illustrated in FIG. 8, the video recording unit 11, the audio recording unit 12 and the auxiliary input recording unit 13 may be provided in the control device 10A whereas the identification units 14 to 16 and the progress information generation unit 17 may be provided in the control device 10B. Such example is advantageous to first record video during an actual battle in the storage device 20 by the control device 10A such as a personal computer arranged at a place where a game is played, and to separately analyze the obtained data D1 to D3 such as video by the control device 10B to generate the progress data DC. In the example of FIG. 8, the storage device 20 may be an external storage connected via a network (LAN or WAN) with the control devices 10A and 10B, or may be a database server. Each of the control device 10 shown in FIG. 3 and the control devices 10A and 10B shown in FIG. 8 is not limited to a stand-alone computer device such as a personal computer, or a computer device as a network terminal, i.e., it may be implemented by a server.

In the above-described embodiments, the information of the image captured by the field camera 2A is used as the medium information required for identifying the card C as an example of the game medium, but the medium information is not limited to the information of the image. For example, an IC chip, a bar code, a two-dimensional code or the like may be attached as the identification information to each of the game media used in the game, or to each of the appendages used in combination with the game medium (for example, a sleeve or the like to the card C), such that the game medium is identified by reading the identification information thereof from the game medium or the like arranged in the field of the game field GF or the like. In this case, a reader for the IC chip, a scanner for the bar code, or the like can be used as the media information acquisition device.

Although in the above-described embodiments, the progress status of the game is specified by identifying both the movement and utterance of the player and referring to the identified movement and utterance as appropriate in place of or in addition to the identification result of the card C, the action of the player may be identified by either the player's movement or the utterance. For example, if the player's movement or the utterance is not used in relation to the progress of the game, or if the player's movement or the utterance is used a little, then only one of the actions may be identified as part of the player's actions and referred to as appropriate.

Although the progress record is repeatedly generated and recorded in the progress data D6 in the above-described embodiments, the progress information may be distributed in real time via the network without being recorded in the storage device. In other words, as long as the information generation system of the present invention includes the process of generating progress information to specify the progress status of the game, the process of recording and keeping the progress information in the storage device for later use may be a process that is appropriately performed as necessary.

The game, i.e., the subject to which the information generation system of the present invention is applied, is not limited to a competition game which proceeds while the game media are appropriately arranged in a plurality of places of the game field. For example, it is possible to apply the information generation system of the present invention to a game which proceeds while one or more predetermined number (which may be variable) of cards as game media are sequentially placed in a predetermined field. If the game does not matter how the game medium is placed, the process of identifying the position of the game medium may be omitted as a matter of course. The information generation system of the present invention can be applied to a game regardless of whether the game is played using a deck as an example of an assembly of game media or not using the deck.

Various aspects of the present invention derived from each of the above-described embodiments and modifications will be described below. It should be noted that in the following description, to facilitate understanding of each aspect of the present invention, corresponding components illustrated in the accompanying drawings are additionally mentioned in parentheses, but this does not intend that the present invention is limited to the illustrated embodiments.

A game progress information generation system (1:1A) according to one aspect of the present invention is the game progress information generation system for a game in which a plurality of players (P1, P2) compete against each other while respectively arranging a plurality of physical game media (C) in a predetermined field (GF), and the game proceeds while an operation, of each player, of arranging the game medium in the field and an action of each player different from the operation are utilized as behavior of each player, configured to generate progress information for specifying progress status of the game, and comprising: a medium information acquiring device (2A) acquiring medium information required for identification of the game medium arranged in the field; a medium identification device (14, S11) identifying the game medium arranged in the field based on the medium information acquired by the medium information acquiring device; an action information acquiring device (2A-2C, 3) acquiring action information required for identification of the action of the player; an action identification device (15, 16, S12, S13) identifying the action of the player based on the action information acquired by the action information acquiring device; and a progress information generation device (17, S15 to S22) repeatedly determining the progress status of the game while referring to an identification result of each of the medium identification device and the action identification device, and generating the progress information based on a determination result to be obtained.

A non-transitory computer readable recording medium according to another aspect of the present invention has a computer program (PG) for a game progress information generation system (1:1A) for a game in which a plurality of players (P1, P2) compete against each other while respectively arranging a plurality of physical game media (C) in a predetermined field (GF), and the game proceeds while an operation, of each player, of arranging the game medium in the field and an action of each player different from the operation are utilized as behavior of each player, the game progress information generation system configured to generate progress information for specifying progress status of the game, and comprising a medium information acquiring device (2A) acquiring medium information required for identification of the game medium arranged in the field, and an action information acquiring device (2A-2C, 3) acquiring action information required for identification of the action of the player, and the computer program configured to cause a computer (10; 10A, 10B) included in the game progress information generation system to function as: a medium identification device (14, S11) identifying the game medium arranged in the field based on the medium information acquired by the medium information acquiring device; an action identification device (15, 16, Sit, S13) identifying the action of the player based on the action information acquired by the action information acquiring device; and a progress information generation device (17, S15 to S22) repeatedly determining the progress status of the game while referring to an identification result of each of the medium identification device and the action identification device, and generating the progress information based on a determination result to be obtained.

A control method according to still another aspect of the present invention is a control method for a game progress information generation system for a game in which a plurality of players (P1, P2) compete against each other while respectively arranging a plurality of physical game media (C) in a predetermined field (GF), and the game proceeds while an operation, of each player, of arranging the game medium in the field and an action of each player different from the operation are utilized as behavior of each player, the game progress information generation system configured to generate progress information for specifying progress status of the game, and the control method comprising: acquiring medium information required for identification of the game medium arranged in the field; identifying the game medium arranged in the field based on the acquired medium information (S1); acquiring action information required for identification of the action of the player; identifying the action of the player based on the acquired action information (S12, S13); repeatedly determining the progress status of the game while referring to an identification result based on the medium information and an identification result based on the action information, and generating the progress information based on a determination result to be obtained (S15 to S22).

In the above-described aspects, in addition to the information of the identification of the game medium arranged in the field, the information of the action different from the operation of the player of arranging the game medium in the field is also acquired.

It should be noted that the computer program according to the aspect of the present invention may be provided in a state of being stored in a storage medium. If the storage medium is used and the computer program according to the present invention is installed and executed in a computer, for example, then it is possible to realize the system of the present invention using the computer. The storage medium in which the computer program is stored may be a non-temporary storage medium such as a CDROM.

In the above-described aspects, the game may be configured to proceed while the movement different from the operation of each player is utilized as at least a part of the behavior, the action information acquiring device may be provided with a movement acquiring device (2B, 2C or 2A-2C) acquiring information corresponding to the movement of each player during the game in progress as the action information, and the action identification device may be provided with a movement identification device (12, S12) identifying the movement of each player based on the information corresponding to the movement.

The movement acquiring device may be a player image acquiring device (2B, 2C or 2A-2C) acquiring an image in which the movement of each player is captured, and the action identification device may be provided so as to identify the movement of each player with utilizing information of the image acquired by the player image acquiring device as information corresponding to the movement.

The medium information acquiring device may be a medium image acquiring device (2A) acquiring an image of the field where the game medium is arranged, and the medium identification device may be provided so as to identify the game medium utilizing information of the image acquired by the medium image acquiring device as the medium information.

In the above-described aspects, the game may be configured to proceed while utterance of each player is utilized as at least a part of the behavior, the action information acquiring device may be provided with an audio acquiring device (3) acquiring information corresponding to the audio (voice) emitted by each player during the game in progress as the action information, and the action identifying device may be provided with an utterance identification device (13, S13) identifying the utterance of each player based on the information corresponding to the audio.

The game may be configured to proceed so that the behavior to be taken by each player are divided into a plurality of stages (e.g., the turns and phases in FIG. 2), and the progress information generation device may determine the stage of the game based on at least one identification result among the identification results of the medium identification device and the action identification device, and may select the identification result to be referred to from the identification results of the medium identification device and the action identification device according to the determined stage to determine the progress status of the game.

In the above-described aspects, the progress information generation device may determine whether or not reference behavior to be occurred when the game is in a particular status is detected based on at least one of the identification results of the medium identification device and the action identification device, and may generate the progress information upon determining that the game is in the particular status (situation) when the reference behavior is detected.

In the above-described aspects, the progress information generation device may further determine influence of the behavior of the player on progress of the game based on the identification result of the medium identification device and the identification result of the action identification device, and may add information corresponding to a determination result to the progress information.

In the above-described aspects, an auxiliary device (CL) to which information related to progress of the game is input may be usable in the game, and the progress information generation device may further refer to the information input to the auxiliary device to determine the progress status of the game.

What is claimed is:

1. A game progress information generation system for a game in which a plurality of players compete against each other while respectively arranging a plurality of physical game media in a field, the game proceeds while an operation, of each player, of arranging the physical game medium in the field and an action of each player different from the operation are utilized as a behavior of each player, and the game proceeds while a movement different from the operation of each player is utilized as at least a part of the behavior, the game progress information generation system configured to generate progress information for specifying progress status of the game, and comprising:
 a medium information acquiring device acquiring medium information required for identification of the physical game medium arranged in the field;
 a medium identification device identifying the physical game medium arranged in the field based on the medium information acquired by the medium information acquiring device;
 an action information acquiring device acquiring action information required for identification of the action of the player;
 an action identification device identifying the action of the player based on the action information acquired by the action information acquiring device; and
 a progress information generation device repeatedly determining the progress status of the game while referring to an identification result of each of the medium identification device and the action identification device, and generating the progress information based on a determination result to be obtained,
 wherein the action information acquiring device is provided with a movement acquiring device that acquires information corresponding to the movement of each player during the game in progress as the action information,
 the action identification device is provided with a movement identification device identifying, based on the information corresponding to the movement, the movement of each player that includes a designating movement by the player to designate a target game medium on which effect of a selected game medium selected by the player is activated, the progress information generation device generates the progress information so as to include effect information of the effect produced on the target game medium by the selected game medium, and the game is a card competition game, the target game medium is a card to be attacked, and the movement identification device identifies a finger motion pointing the card along with at least one of a pointing position and a pointing direction as the designating movement.

2. The game progress information generation system according to claim 1, wherein the movement acquiring device is a player image acquiring device that acquires an image in which the movement of each player is captured, and the action identification device identifies the movement of each player by utilizing information of the image acquired by the player image acquiring device as the information corresponding to the movement.

3. The game progress information generation system according to claim 1, wherein the medium information acquiring device is a medium image acquiring device acquiring an image of the field where the physical game medium is arranged, and the medium identification device is provided so as to identify the physical game medium utilizing information of the image acquired by the medium image acquiring device as the medium information.

4. The game progress information generation system according to claim 1, wherein the game is configured to proceed while utterance of each player is utilized as at least a part of the behavior, the action information acquiring device is provided with an audio acquiring device acquiring information corresponding to audio emitted by each player during the game in progress as the action information, and the action identification device is provided with an utterance identification device identifying the utterance of each player based on the information corresponding to the audio.

5. The game progress information generation system according to claim 1, wherein the game is configured to proceed so that the behavior to be taken by each player are divided into a plurality of stages, and the progress information generation device determines a stage of the game based on at least one identification result among the identification results of the medium identification device and the action identification device, and selects the identification result to be referred to from the identification results of the medium identification device and the action identification device according to the determined stage to determine the progress status of the game.

6. The game progress information generation system according to claim 1, wherein the progress information generation device determines whether or not a reference behavior to be occurred when the game is in a particular status is detected based on at least one of the identification results of the medium identification device and the action identification device, and generates the progress information upon determining that the game is in the particular status when the reference behavior is detected.

7. The game progress information generation system according to claim 1, wherein the progress information generation device further determines influence of the behavior of the player on progress of the game based on the identification result of the medium identification device and the identification result of the action identification device, and adds information corresponding to a determination result to the progress information.

8. The game progress information generation system according to claim 1, wherein an auxiliary device to which information related to progress of the game is input is usable in the game, and the progress information generation device further refers to the information input to the auxiliary device to determine the progress status of the game.

9. A non-transitory computer readable recording medium having a computer program for a game progress information generation system for a game in which a plurality of players compete against each other while respectively arranging a plurality of physical game media in a field, the game proceeds while an operation, of each player, of arranging the physical game medium in the field and an action of each player different from the operation are utilized as a behavior of each player, and the game proceeds while a movement different from the operation of each player is utilized as at least a part of the behavior, the game progress information generation system configured to generate progress information for specifying progress status of the game, and comprising a medium information acquiring device acquiring medium information required for identification of the physical game medium arranged in the field, and an action information acquiring device acquiring action information required for identification of the action of the player, and the computer program configured to, when executed by a computer, cause the computer included in the game progress information generation system to function as at least:

a medium identification device identifying the physical game medium arranged in the field based on the medium information acquired by the medium information acquiring device;

an action identification device identifying the action of the player based on the action information acquired by the action information acquiring device; and a progress information generation device repeatedly determining the progress status of the game while referring to an identification result of each of the medium identification device and the action identification device, and generating the progress information based on a determination result to be obtained, wherein the action information acquiring device is provided with a movement acquiring device that acquires information corresponding to the movement of each player during the game in progress as the action information, the action identification device is provided with a movement identification device identifying, based on the information corresponding to the movement, the movement of each player that includes a designating movement by the player to designate a target game medium on which effect of a selected game medium selected by the player is activated, the progress information generation device generates the progress information so as to include effect information of the effect produced on the target game medium by the selected game medium, and the game is a card competition game, the target game medium is a card to be attacked, and the movement identification device identifies a finger motion pointing the card along with at least one of a pointing position and a pointing direction as the designating movement.

10. A control method for a game progress information generation system for a game in which a plurality of players compete against each other while respectively arranging a plurality of physical game media in a field, the game proceeds while an operation, of each player, of arranging the physical game medium in the field and an action of each player different from the operation are utilized as a behavior of each player, and the game proceeds while a movement different from the operation of each player is utilized as at least a part of the behavior, the game progress information generation system configured to generate progress information for specifying progress status of the game, and the control method comprising:

acquiring medium information required for identification of the physical game medium arranged in the field;

identifying the physical game medium arranged in the field based on the acquired medium information;

acquiring action information required for identification of the action of the player;

identifying the action of the player based on the acquired action information; and repeatedly determining the progress status of the game while referring to an identification result based on the medium information and an identification result based on the action information, and generating the progress information based on a determination result to be obtained, wherein action information includes information corresponding to the movement of each player during the game in progress, the identifying the action includes identifying, based on the information corresponding to the movement, the movement of each player that includes a designating movement by the player to designate a target game medium on which effect of a selected game medium selected by the player is activated, and the progress information is generated so as to include effect information of the effect produced on the target game medium by the selected game medium, and the game is a card competition game, the target game medium is a card to be attacked, and in the identifying, a finger motion pointing the card along with at least one of a pointing position and a pointing direction is identified as the designating movement.

* * * * *